US008052082B1

(12) United States Patent
Herlik

(10) Patent No.: US 8,052,082 B1
(45) Date of Patent: Nov. 8, 2011

(54) OPTIMIZED AERODYNAMIC, PROPULSION, STRUCTURAL AND OPERATIONS FEATURES FOR LIGHTER-THAN-AIR VEHICLES

(76) Inventor: Edward Charles Herlik, Colorado Springs, CO (US)

( * ) Notice: Subject to any disclaimer, the term of this patent is extended or adjusted under 35 U.S.C. 154(b) by 1079 days.

(21) Appl. No.: 11/486,478

(22) Filed: Jul. 15, 2006

(51) Int. Cl.
*B64B 1/06* (2006.01)
(52) U.S. Cl. .............................. 244/30; 244/24; 244/125
(58) Field of Classification Search .................. 244/24, 244/25, 26, 27, 28, 29, 30, 31, 125, 126, 244/128
See application file for complete search history.

(56) References Cited

U.S. PATENT DOCUMENTS

| | | | | |
|---|---|---|---|---|
| 2,191,759 | A * | 2/1940 | Hilberth | 244/30 |
| 3,346,216 | A * | 10/1967 | Desmarteau | 244/30 |
| 3,488,019 | A * | 1/1970 | Sonstegaard | 244/30 |
| 3,844,507 | A * | 10/1974 | Papst | 244/30 |
| 4,402,475 | A * | 9/1983 | Pavlecka | 244/96 |
| 4,967,983 | A * | 11/1990 | Motts | 244/30 |
| 5,071,090 | A | 12/1991 | Takahashi | |
| 5,348,254 | A | 9/1994 | Nakada | |
| 5,358,200 | A | 10/1994 | Onda | |
| 5,518,205 | A | 5/1996 | Wurst | |
| 5,538,203 | A | 7/1996 | Mellady | |
| 5,645,248 | A | 7/1997 | Campbell | |
| D427,137 | S | 6/2000 | Lee | |
| 6,082,670 | A | 7/2000 | Chapman | |
| 6,302,357 | B1 * | 10/2001 | Kalisz | 244/30 |
| 6,305,641 | B1 | 10/2001 | Onda | |
| 6,311,925 | B1 | 11/2001 | Rust | |
| 6,328,257 | B1 * | 12/2001 | Schafer | 244/30 |
| 6,425,552 | B1 | 7/2002 | Lee | |
| 6,427,943 | B2 | 8/2002 | Yokomaku | |
| 6,609,680 | B2 * | 8/2003 | Perry et al. | 244/30 |
| 6,698,686 | B2 | 3/2004 | Ogawa | |
| 6,708,922 | B1 | 3/2004 | Hamilton | |
| 6,766,982 | B2 | 7/2004 | Drucker | |
| 6,793,180 | B2 * | 9/2004 | Nachbar et al. | 244/125 |
| 6,837,458 | B2 | 1/2005 | Swearingen | |
| 6,966,523 | B2 | 11/2005 | Colting | |
| 6,983,910 | B2 * | 1/2006 | Yajima et al. | 244/30 |
| 7,156,342 | B2 * | 1/2007 | Heaven et al. | 244/30 |
| 7,317,261 | B2 * | 1/2008 | Rolt | 290/55 |
| 7,552,893 | B2 * | 6/2009 | Colting | 244/30 |
| 2003/0111577 | A1 * | 6/2003 | Yajima et al. | 244/128 |
| 2006/0231678 | A1 * | 10/2006 | Nagy | 244/30 |
| 2006/0261213 | A1 * | 11/2006 | Lavan | 244/30 |

(Continued)

FOREIGN PATENT DOCUMENTS

GB 2411209 A * 8/2005

OTHER PUBLICATIONS

Schafer, Kuke & Lindstrand; Airships as Unmanned Platforms, 2002, all pages, AIAA-2002-3423, US, 10 pages (attached).

(Continued)

*Primary Examiner* — Benjamin P Lee

(57) ABSTRACT

An optimized lighter-than-air vehicle or airship incorporating a frame 104, internal propulsion 124, perforated covering 102 and lifting-gas cells 110 is disclosed. Optimization features include variations on a Stratford Ramp, means to control the boundary layer 210, absence of unnecessary protuberances and means to reduce the bow wave. A transportable version utilizing a flexible frame 310 and keels 314 is also disclosed along with a means for rapid descent and landing. The operating concept reduces velocity requirements which, in turn, reduce weight and size requirements.

14 Claims, 5 Drawing Sheets

U.S. PATENT DOCUMENTS

| | | | |
|---|---|---|---|
| 2007/0281570 A1* | 12/2007 | Liggett et al. | 442/378 |
| 2008/0011900 A1* | 1/2008 | Quintana | 244/30 |
| 2009/0152391 A1* | 6/2009 | McWhirk | 244/30 |
| 2009/0200416 A1* | 8/2009 | Lee | 244/30 |
| 2009/0294576 A1* | 12/2009 | LaForge | 244/30 |

OTHER PUBLICATIONS

Lutz & Wagner; Numerical Shape Optimization of Natural Laminar Flow Bodies, 1998, all pages, AIAA, US, 11 pages (attached).

* cited by examiner

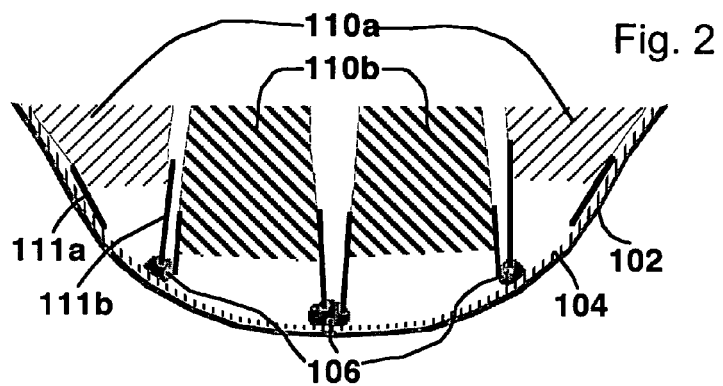
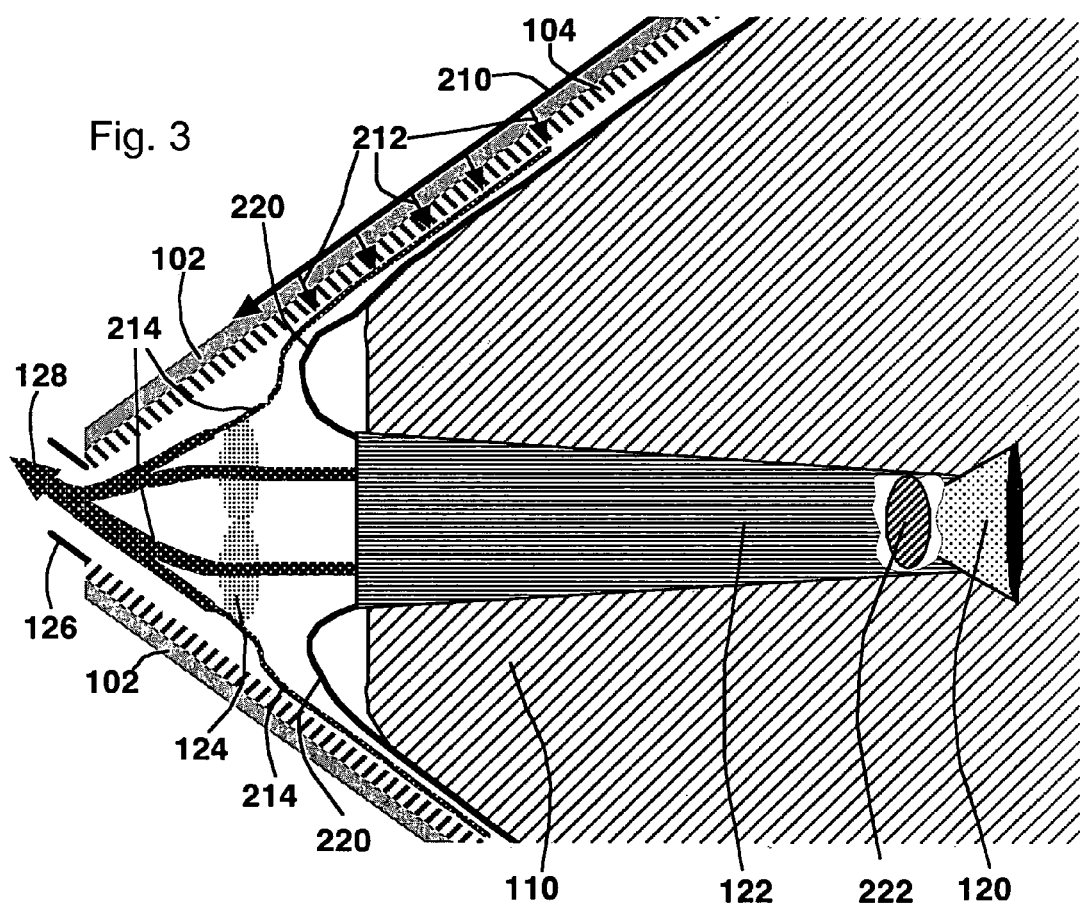

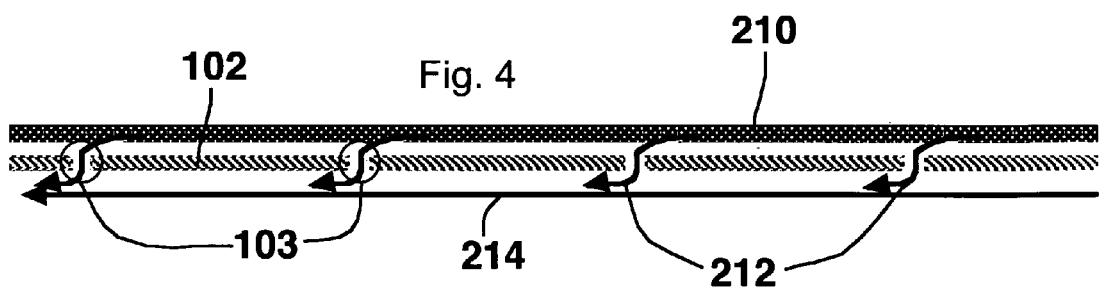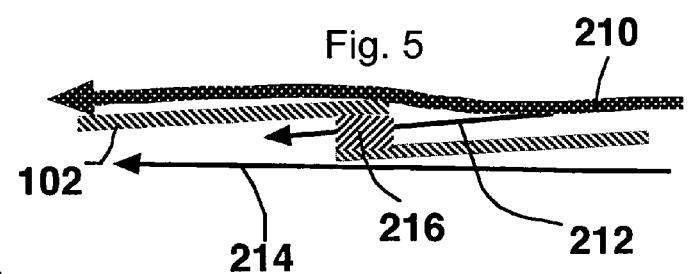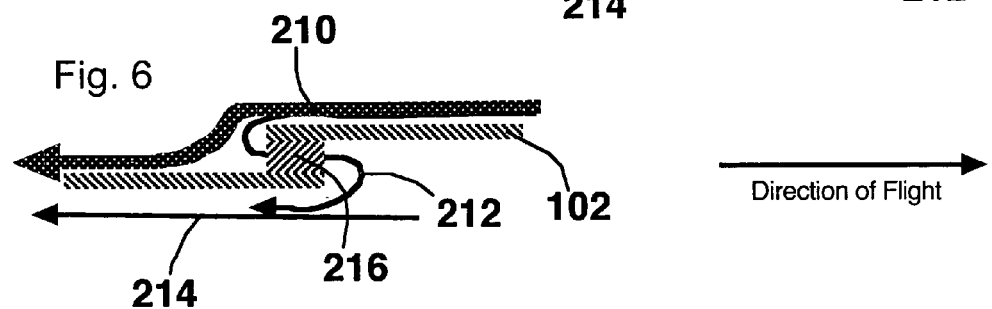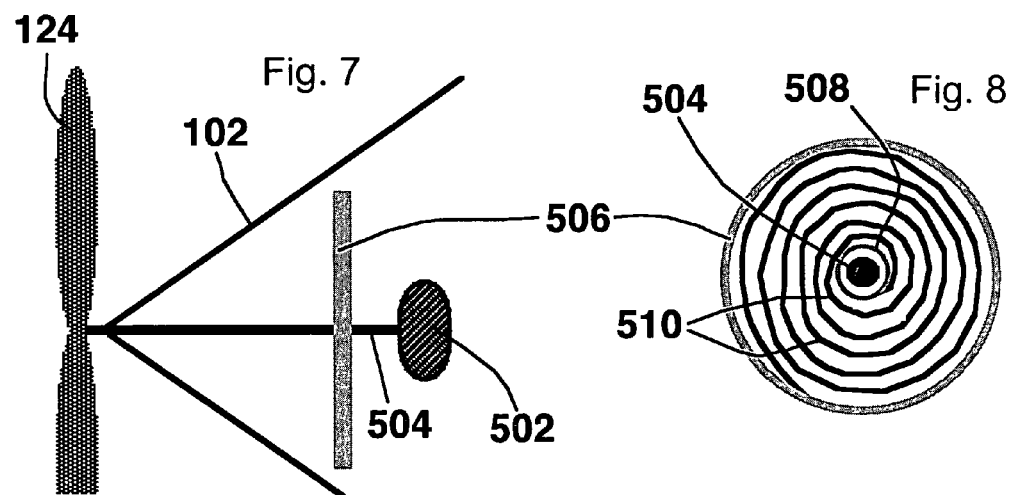

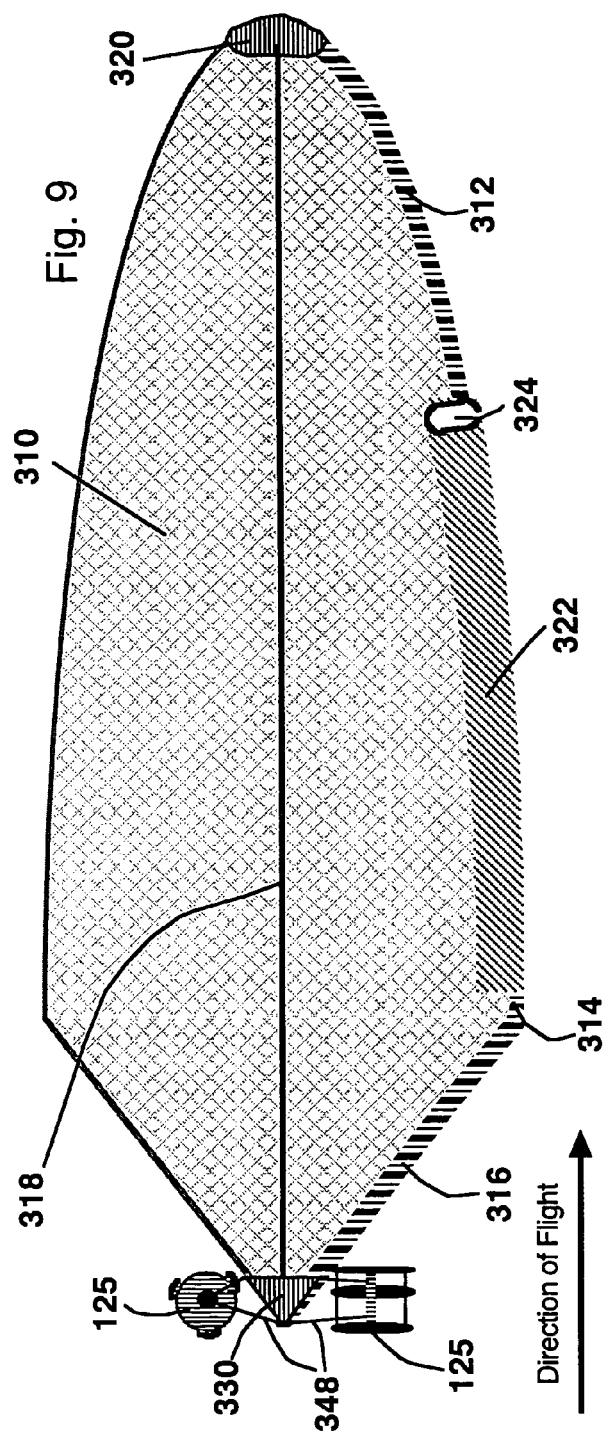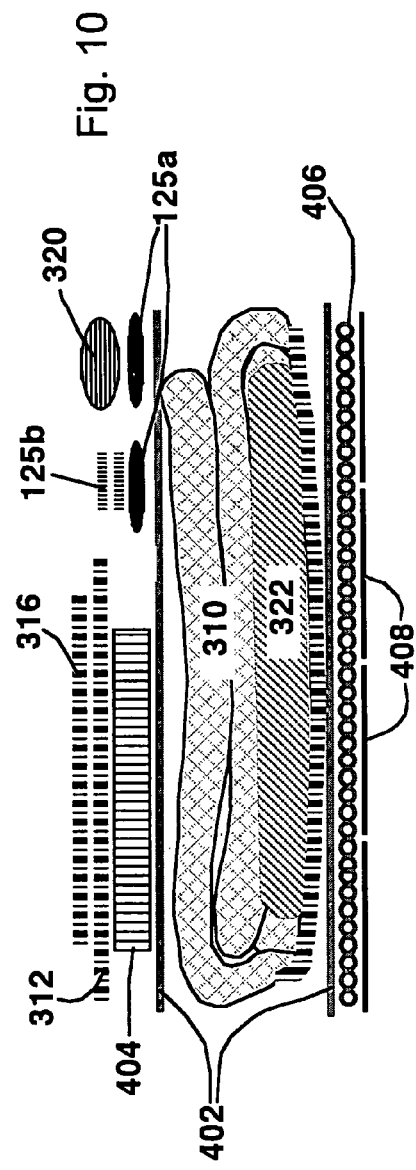

OPTIMIZED AERODYNAMIC, PROPULSION, STRUCTURAL AND OPERATIONS FEATURES FOR LIGHTER-THAN-AIR VEHICLES

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to lighter-than-air vehicles in general, and to structural plus aerodynamic features optimizing such vehicles for their intended flight environments specifically, with a method to optimize their operation for long-endurance station keeping.

2. Prior Art

The airship field is quite crowded making even modest innovations significant. The need for innovation is most pronounced at very high altitude, here defined as above the jet stream, where many solutions developed for the troposphere fail. For example: traditional design and construction techniques are too heavy; fabrics quickly fail in the intense radiation environment, primarily ultraviolet; traditional shapes are aerodynamically inefficient at the very low Reynolds Numbers above the jet stream [Re: a dimensionless ratio of the product of air density, velocity and length divided by viscosity. Lower Re conditions are more difficult for any aircraft and, therefore, require precise optimization.]; known propulsion systems are inefficient or even ineffective; vehicles cannot be resupplied; and the jet stream's extreme conditions must be crossed at least twice per mission in common latitudes.

On the other hand, flight above the jet stream offers significant advantages, including: generally lower average wind velocities between about 60,000 and 80,000 feet above sea level; the field of view is several hundred miles in diameter; a significantly extended exposure to the energy in sunlight relative to lower altitudes; little to no exposure to extreme weather; significantly extended line of sight contact with low altitude satellites; and there is no interference with or from conventional aircraft.

Given this crowded field, I'll summarize only the recent advances with non-exclusive emphasis on high altitude flight.

The American Institute of Aeronautics and Astronautics, Inc (AIAA) published an excellent summary by Shafer, Kuke, and Lindstrand in 2002. This is essentially the most current work on very high altitude airships. Their first design, "Lotte", used the conventional elliptical shape appropriate for low altitude plus conventional fins, ballonets [Dictionary.com: "One of several small auxiliary gasbags placed inside a balloon or a non-rigid airship that can be inflated or deflated during flight to control and maintain shape and buoyancy."], a propeller and lifting gas cells.

Their second model, "Speedy", still displayed serious problems. It retained conventional, non-rigid construction requiring fins for flight control, for example. A boom extending down from the nose balanced the ship which obviously cannot remain on an operational design. Speedy does display a more relevant shape, however, which is more appropriate for low Re than other designs. The paper focuses on the flight environment and potential missions before suggesting a solution based on solar energy with fuel cell storage.

Shafer et. al. utilized the shape optimization work published by Lutz and Wagner in "Numerical Shape Optimization of Natural Laminar Flow Bodies". These researchers defined airship shapes optimized for various low Re conditions. Incorporating a turbulent boundary layer, such as that optionally created by my external frame, has not been disclosed previously. While such turbulence increases form drag, it reduces aerodynamic or "wake" drag in a manner similar to the overall benefit produced by dimples on a golf ball. This benefit is more pronounced on relatively smaller airships.

Prior Art: Airship Construction

General construction philosophy is the most crowded area in the airship art. Nearly all airship designs are variations on the pressurized "blimp" defined by Dictionary.com as "A non-rigid, buoyant airship." Non-rigid designs are outdated and especially inappropriate at high altitudes. They require flexible coverings, typically fabrics or films, to bear stresses that, with safety factors, reach 1000 psi. Systems must be hung from fabric surfaces or on a keel that is itself affixed to fabric or film.

Non-rigid airships also necessarily reduce the buoyancy of lifting gasses by compression. Buoyancy is directly proportional to the weight of a substance contained in a space. Compressing gas, with or without ballonets, is necessary to maintain a non-rigid ship's form in the same way that a party balloon requires internal pressure to maintain shape. But such compression within the same space increases the gas' density which increases the total weight of the artificially dense gas, thereby reducing buoyancy. This problem is not factored into lifting gas calculations.

The recent art in non-rigid design has generally focused on gas management, specifically ballonets.

Swearingen et al, in U.S. Pat. No. 6,837,458 Jan. 4, 2005, uses conventional gas bags and construction formed into an airfoil-shaped airship optimized for passengers and low altitude. Given that its major axis is perpendicular to the direction of flight, control in disturbed air will be problematic.

Ogawa et al, in U.S. Pat. No. 6,698,686 Mar. 2, 2004, describes a means to move lifting gas between lifting-gas cells for pitch control while bulkheads and air filled chambers maintain the airship's shape. But aerodynamic transients act far too quickly to rely on moving huge volumes of gas for balance, especially given the "plurality of additional compartments", i.e. baffles which inhibit gas movement.

Perry et al, in U.S. Pat. No. 6,609,680 Aug. 26, 2003, disclosed a flaccid launch method that relies on natural lifting gas expansion to fill out the non-rigid ship as it rises to operating altitude plus moving ballast for rotation to a horizontal flight attitude. The ship then destroys the hull to collapse it for descent, with or without its payload. But this design recently failed several times during flight testing because the flaccid launch method does not allow for an optimized shape, resulting in high aerodynamic drag. The propulsion system could not resist the prevailing wind at the operating altitude. And, the thin film hull was once destroyed by environmental forces. This design also prohibits adhering systems to the hull, such as solar panels. Even if the drag versus thrust problems were solved, this technique prevents fully inflated systems checks before launch allowing hidden problems to manifest after it's too late to correct them.

Perry et al, in U.S. Pat. No. 6,607,163 Aug. 19, 2003, disclosed another conventional design but with liquid ballast. Given that vehicle gross weight is the single most important factor in the high altitude environment, lifting ballast is a serious flaw which subtracts directly from useful payload. This patent also discloses an internal solar cell arrangement covered by a transparent membrane. That solution is impractical given that intense ultraviolet radiation turns suitable materials opaque in the relevant frequencies over the long durations intended for this airship.

Yokomaku et al, in U.S. Pat. No. 6,427,943 Aug. 6, 2002, discloses a common diaphragm design for separating lifting gas from air but with suspension cords added to reduce sloshing. That design seems as reasonable as baffles regarding sloshing but does not address the fundamental flaws inherent in such pressurized airships.

Onda in U.S. Pat. No. 6,305,641 Oct. 23, 2001, disclosed a super pressured high-altitude airship with "no in-flow or out-flow of gas". That design cannot work given that gas expands 16 fold between sea level and the 20 km design altitude. Even if a miraculous material could be developed to withstand that pressure, the vehicle would never reach high altitude. Gas lifts because it is less dense than the surrounding air. Containing all gas in this manner guarantees that the ship will rise no higher than the point at which the highly compressed gas plus the ship's structure weighs essentially as much per volume as the surrounding air.

Campbell in U.S. Pat. No. 5,645,248 Jul. 8, 1997 disclosed a spherical airship of conventional construction with ballonets and ballast. He shows an innovative propulsion system consisting of a duct through the entire ship with a propulsion fan and rudders mounted internally. His objective is to minimize drag within the duct with no mention of aerodynamic drag from the sphere. Given the geodesic frame required to support the internal features, the ballast and the lack even of the boundary layer control taught by Colting '523 below, it's apparent that Campbell '248 does not mention stratospheric flight because the vehicle would be too heavy and create far too much aerodynamic drag to operate there. It would also prove seriously inefficient at any altitude. A sphere is easy to build but impossible to optimize aerodynamically.

Mellady in U.S. Pat. No. 5,538,203 Jul. 23, 1996, expands the normal pair of ballonets into a plurality, again, without addressing the fundamental flaws of non-rigid airships briefly described above.

There has been some attempt at developing semi-rigid airships with a spine or keel.

Nakada in U.S. Pat. No. 5,348,254 Sep. 20, 1994 disclosed a single keel. In this case, the keel does not give shape to the airship but rather is suspended from conventional gas bags and ballonets. Nakada '254's innovation separates the heavy systems from direct attachment to fabric. The keel supports the empennage, gondola and hydrogen motor. This innovation is minor, however, in that problems attaching motors, etc. to external covering fabric are simply replaced by problems attaching a weighted keel to that same fabric.

Hamilton in U.S. Pat. No. 6,708,922 Mar. 23, 2004, disclosed a sectional spine necessary for the modular airship construction, which is his objective. Such a ship must have uniform or symmetric segments by definition and so cannot be optimized aerodynamically. It is relatively heavy given the frame construction with redundant connection points. The result is a conventional, low altitude airship of somewhat reduced efficiency. As in Nakada '254, the spine does not support the shape in this overpressure, non-rigid ship but is necessary for another purpose, to provide connection points for modular segments.

Sanswire Networks LLC has attempted to build a rigid frame airship during 2005 and 2006 for flight above the jet stream as disclosed on http://www.sanswire.com/stratellites.htm. Those designs have failed to date because their conventional rib and bracing design, conventional propulsion, and pressurized gas containers proved too heavy and aerodynamically inefficient for operation. They have yet to fly a relevant airship.

Prior Art: Aerodynamics

There have been attempts at improving or optimizing airship aerodynamics. Significantly, I could not find high altitude or "stratospheric" airship proposals that build on research into the low Reynolds Number (Re) conditions appropriate for such low ambient pressure applications. Relevant research by Lutz and Wagner was discussed above and forms the basis for optimized airship shapes.

Colting in U.S. Pat. No. 6,966,523 Nov. 22, 2005, advocated another spherical airship, this one intended for the stratosphere. He included a pusher propeller at the rear of the ship to draw the boundary layer around the skin by suction and reduce drag. But a round shape is so inherently high drag that there is no practical propulsion system which could overcome such resistance and still be reasonably lifted to 60,000 feet with more than a few hours' endurance. Compounding the problem, boundary layers separate at the widest point on a ship in the very low Re found above the jet stream. In other words, a spherical ship's boundary layer at very low Re will separate long before it could be influenced by the external suction of this design. The result is a propulsion system rendered ineffective by the separated, turbulent airflow at the back of the sphere.

Rist in U.S. Pat. No. 6,311,925 Nov. 6, 2001, discussed a low altitude, very heavy lift hybrid airship that requires the high thrust of turboprop engines to create the necessary forward velocity for its wings to lift the ship. In Rist '925's innovation, wings are required as the ship needs both static and dynamic lift. The result is a lifting hull that's intentionally far too small to create even neutral buoyancy. Rist '925 also taught an external storage chamber for lifting gas that must be carried in a detachable cargo container. That lifting gas movement modulates pitch similar to Ogawa et al, '686; an idea discredited by the rapidity with which atmospheric forces act. The ship is also burdened by conventional ballonets. It is not a true lighter-than-air vehicle and cannot function at significant altitudes.

Lee et al, in design Pat. D427,137 Jun. 27, 2000, appears to disclose a relevant outline in that the general shape would be efficient at a low Re. The ship's aft end includes a pusher propeller contained in a full circumference shroud. But, as in a design discussed later, such a shroud is ineffective. While somewhat reducing drag from detached airflow within the shroud, total drag is not reduced because the detached airflow drag from the ship's after body is simply replaced by drag on the outside surface of the shroud. The shroud's dead weight is an unnecessary burden in addition. This design is also not detailed enough to reveal a means to control the ship.

Chapman in U.S. Pat. No. 6,082,670 Jul. 4, 2000, proposed drag reduction means for fluid borne vehicles. In this case, he provides a full circumference inlet essentially at the ship's widest point that draws fluid into the ship and through the propulsion system. Chapman '670 specifies an afterbody angle of no more than 15 degrees from horizontal. But the substantially full circumference inlet, certainly when combined with the shallow after body, cannot work at low Reynolds Numbers as the fluid boundary will separate immediately aft of that inlet in a manner somewhat similar to Lee et al, 'D137. The weight and complexity of that inlet design will not be offset by a more beneficial drag reduction in air, though it may be beneficial at the very high Re in water. In addition, Goldschmied demonstrated essentially Chapman '670's concept in a wind tunnel before 1981. Goldschmied noted that the full circumference inlet design would only work for one set of conditions, one Re, and so is not practical on a flight vehicle. Further proof that Chapman '670's innovation could only apply at low altitudes is seen in the preferred embodiment which places the ship's "largest diameter" in the forebody while the inlet intended to prevent boundary layer separation appears to be half of the ship's length further aft. Those two points, largest diameter and boundary layer separation, move closer together as altitude increases.

Onda in U.S. Pat. No. 5,358,200 Oct. 25, 1994 attempted boundary layer control in a similar manner. Rather than draw the boundary layer through an internal propulsion system, Onda '200 advocated a braced shroud enclosing the propeller aft of the main body and forward of an inflated empennage. That means is also ineffective for the same reason as Lee 'D137 and Chapman '670: boundary layer separation on the shroud creates essentially the same drag as on an unmodified ship. In addition, Onda '200 added a very large empennage which is itself a significant drag on a vehicle in low Re. Onda also proposed positioning the ship's maximum diameter as far aft as possible. But that simple design criterion too is inefficient as each combination of airship length and operating altitude—the major factors in a Reynolds Number calculation—results in a somewhat different optimum shape.

Prior Art: Sub-Systems

Sub-systems, those significant elements required for operation, taught in several patents seem relevant before close examination.

Drucker in U.S. Pat. No. 6,766,982 Jul. 27, 2004, disclosed another ship with a duct from front to rear (like Campbell '248) but would install a wind turbine in the duct for energy production. Such an airship relies on other propulsion means. Drucker '982 advocated floating with the wind for movement over the ground while extracting energy from that wind. This system cannot work. Vehicles floating with the wind have, by definition, no "relative wind" flowing around them because the vehicle and the air mass travel at the same speed (see unpowered balloons). The wind turbine would not turn without a velocity difference. When driven by the ship's propulsion system, drag from the duct's walls and the turbine would cost more energy than could be extracted given the laws of thermodynamics.

Lee et al, in U.S. Pat. No. 6,425,552 Jul. 30, 2002, disclosed a thermal management system to smooth out buoyancy fluctuations due to heating or cooling of the lifting gas. This proposal would work by storing hydrogen during the day and converting it to heat in fuel cells at night. Lee '552's very complicated system imposes severe design restrictions: the ship must use hydrogen, must have fuel cells, must include pressurized lifting-gas cells plus ballonets, must store water, and must insulate the ship from the sun and albedo radiation. This patent also proposes to heat lifting gas during the day and cool it at night, a process that would exacerbate the same natural heat during the day and cool at night cycle. Another fault is seen in this proposal's plan to control pitch through "cyclically manipulating" temperature. As with the above proposals to shift lifting gas, this method results in a far too slow response to environmental upsets such as turbulence. Such use of heat to maintain pressure and thereby control buoyancy is not useful in this case due to the heavy equipment required. Such an airship would either be massive or have little useful payload. More fundamentally, heating a gas only produces lift if the gas is free to expand. Heating a gas confined in a pressurized cell accomplishes nothing while increasing stress on the cell's structure.

Onda '641 also discussed a duct from the front to the rear of a ship to remove heat from the solar cell area, thereby improving the solar cell's efficiency. But convection, as distinct from conduction, is extremely inefficient in thin gas such as the stratosphere. In other words, moving transient ambient air below the solar cells will not significantly affect their heating in sunlight. Onda '641 does not block such airflow at night thereby denying those solar cells the heat absorbed by the rest of the ship. The result would be solar cells cooled to −60° C. by morning thereby putting tremendous thermal strain on the mechanics.

Onda '641 also states that the air discharged rearward by the ventilation system would reduce drag through fluid control. But Onda never explains how such drag reduction would occur or how he would compensate for the resulting asymmetric forces. Testing on the experimental fixed-wing aircraft X-21A proved that such fluid control requires pulling the boundary layer through the skin. Blowing air from the aft end of the ship, as was disclosed here, would be ineffective as the boundary layer will separate well forward of that point.

Onda '641 also disclosed another weight shifting pitch attitude control system. This proposal has less merit than appears at first glance given the non-rigid design. Shifting batteries as proposed, for example, is impractical to the point of hazardous to the ship's structure when the primary support is fabric. This point is especially relevant given the critical nature of fabric pressurized by the 16-fold expansion of gas. Such fabric cannot survive the slightest imperfection or impact, such as from moving machinery.

Campbell '248 requires a geodesic frame to support the spherical airship. But a geodesic frame is uniquely associated with spheres or sections of a sphere. That design will not work in other shapes. The frame also does not obviate the need for non-rigid airship systems. Campbell '248 still requires pressurized gas bags, ballonets and ballast. It is the worst of both worlds.

Wurst et al, in U.S. Pat. No. 5,518,205 May 21, 1996, advocates a hybrid high altitude aircraft composed largely of helium filled sections. The aircraft is intended to fly above the weather while avoiding winds that substantially exceed its velocity. Those conditions only exist above the jet stream or higher than approximately 55,000 feet in northern latitudes. At those altitudes, this aircraft would experience extreme difficulties. Its weight shifting attitude control would need to rotate the solar cell-covered wing to nearly vertical early and late in the day to meet the requirement to be somewhat normal to the sun's angle of incidence. That severe bank leaves the question of directional control entirely unanswered. The cables supporting that gondola, the gondola itself, and the numerous complicated shapes generate tremendous drag relative to the reduced thrust available from propellers at those altitudes. The hydrogen storage cells towed behind the aircraft would almost never float directly in line and, therefore, would pull the aft of the aircraft up or down as gas is pumped in or out. Such flaws explain why this hybrid aircraft is not in operation.

Takahashi et al, in U.S. Pat. No. 5,071,090 Dec. 10, 1991, disclosed a propulsion and control means requiring a fluid pathway or duct running the full length of a ship from bow to stern. The pathway includes one or more intersections allowing lateral pathways to exit the ship at various points thereby thrusting the front or rear in desired directions with propelled air. But the preferred embodiment cannot be built. Takahashi et al, '090 lists dimensions of "5 to 10 m" length and the same width. A 10 meter long ship of any width, with approximately half of its internal volume devoted to an empty passageway, cannot lift the claimed 1 to 10 horsepower propulsion system with a power supply, much less a gondola and crew cabin. Even assuming a correct configuration, adding structural weight while eliminating approximately half of the space usually available for lifting gas relegates this design to inefficient, low altitude operations with less utility than decades old alternatives.

It is obvious from this review of recent innovations that there is room for improvement in lighter-than-air vehicles, especially those designed for flight above the jet stream. The prior art clearly shows that lighter-than-air vehicles cannot be optimized with the established technologies typified by non-rigid design, control fins and external motors.

SUMMARY

According to one aspect of my invention, lighter-than-air vehicles have optimized aerodynamics, with rigid or semi-rigid construction necessarily enabled by internal or external frames that substantially bear the stresses. A more optimized propulsion means improves aerodynamic qualities while also allowing the elimination of some protuberances. I also propose a means to assemble and launch such craft under austere conditions near their intended operating areas and an operating method that allows more efficient design. As seen in prior art short comings, lighter-than-air vehicle design elements or considerations are so necessarily interrelated as to require the aggregation of features disclosed in my invention.

DRAWINGS

Figures

FIG. 2 is a partial cross section of the proposed airship in FIG. 1 showing frame, keel and lifting-gas cell details.

Figure 1:
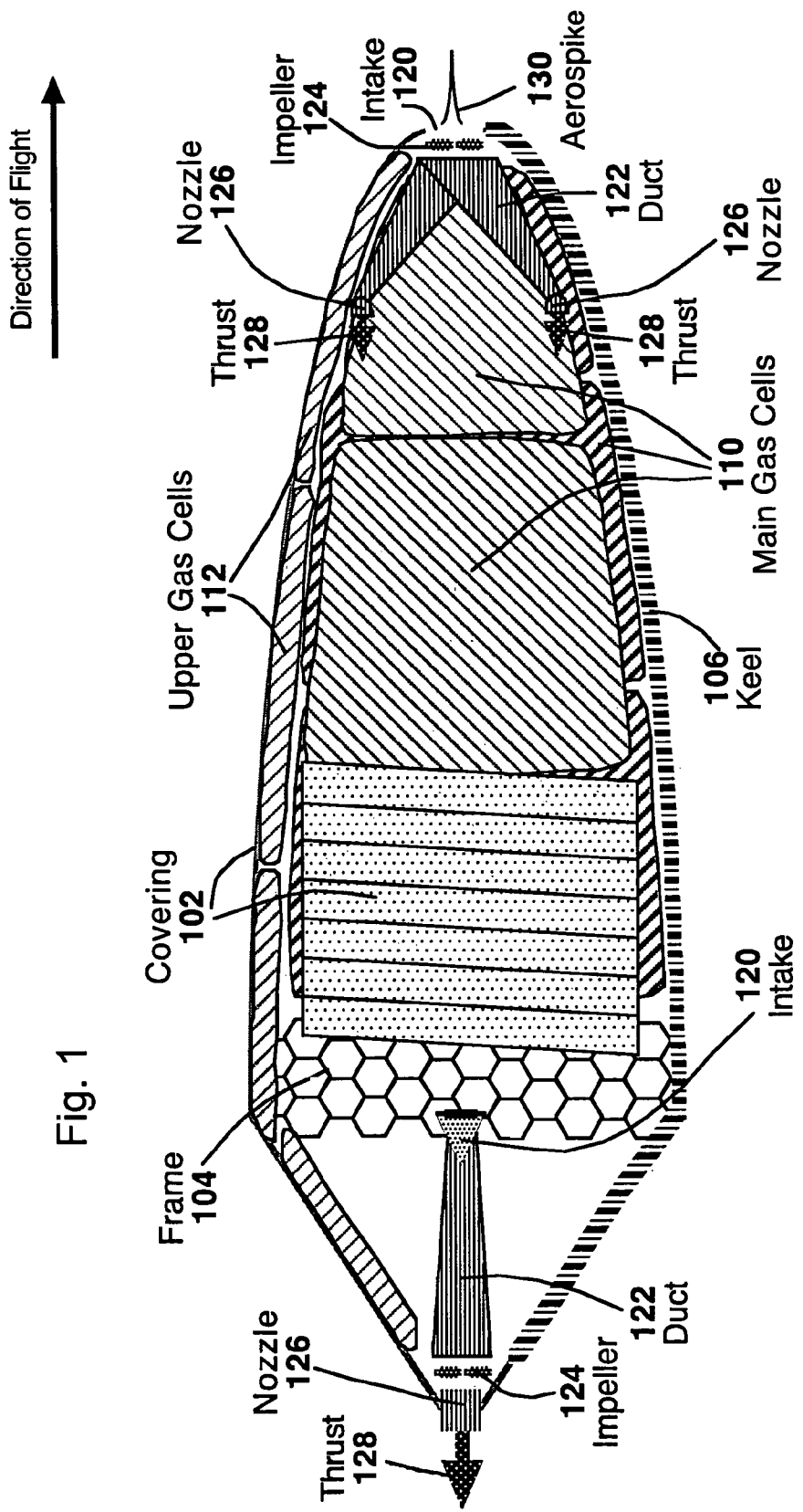
FIG. 1 is an overview of a proposed high altitude airship displaying a number of individual features.

FIG. 3 details airflow through the aft propulsion means of the airship in FIG. 1.

FIGS. 4, 5, and 6 detail views of means to control a boundary layer applicable to the configuration of FIG. 3.

FIGS. 7 and 8 illustrate one variation on a mechanical potential energy storage means.

FIG. 9 is a side view of an alternative airship embodiment incorporating a flexible external frame and cycloidal propulsers.

FIG. 10 illustrates features that facilitate transportation and rapid assembly of the alternative airship in FIG. 9.

Figure 11:
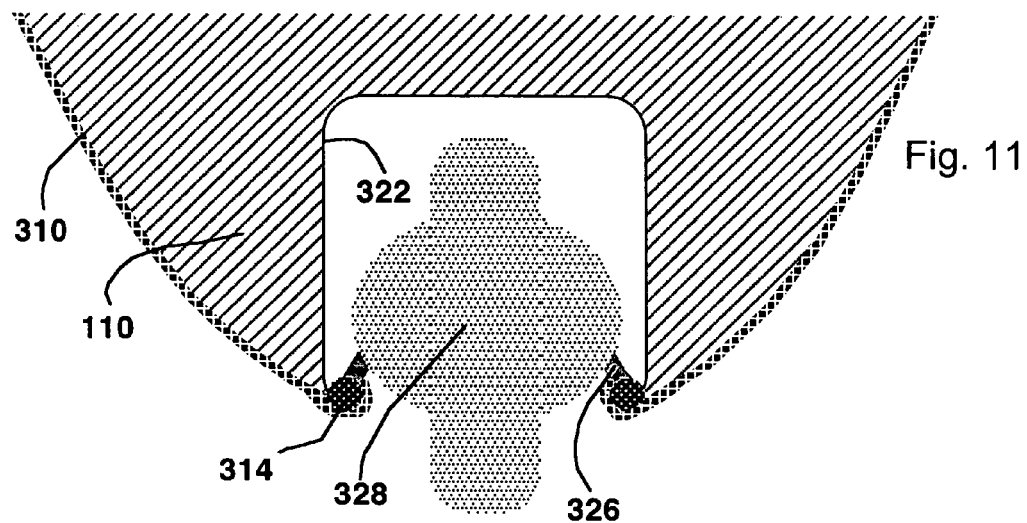

FIG. 11 details a partial cross section of the alternative airship in FIG. 9 including external frame attachment.

Figure 12:
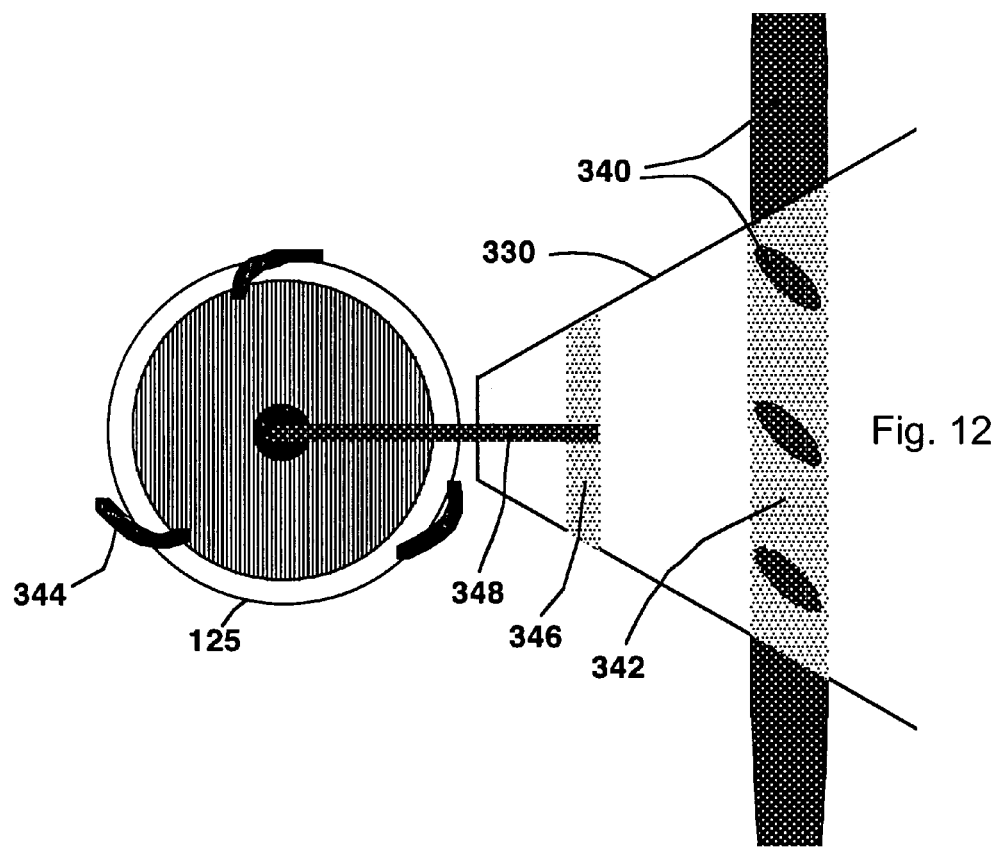

FIG. 12 illustrates an alternative hybrid propulsion arrangement combining screw and cycloidal systems.

DRAWINGS

Reference Numerals

| 102 | Covering | 110 | Main Lifting-Gas Cells |
|---|---|---|---|
| 103 | Openings in Covering | 110a | Outer Main Lifting-Gas Cells |
| 104 | Rigid Frame | 110b | Inner Lifting-Gas Cells |
| 106 | Rigid Keel | 111 | Lifting-Gas Cell Attachment |
| 112 | Upper Lifting-Gas Cells | 322 | Payload Tunnel |
| 120 | Air Intake | 324 | Parachute |
| 122 | Air Duct | 326 | Payload Support |
| 124 | Screw-Type Impeller | 328 | Generic Payload |
| 125 | Cycloidal Propulser | 330 | Engine Mount |

-continued

| 126 | Nozzle | 340 | Screw Propeller Blade |
|---|---|---|---|
| 128 | Thrust | 342 | Propeller Mount Ring |
| 130 | Aerospike | 344 | Cycloidal Propulser Blade |
| 210 | Boundary Layer | 346 | Propulser Mount Ring |
| 212 | Stagnant Air | 348 | Propulser Attachment |
| 214 | Internal Airflow | 402 | Shipping Container Divider |
| 216 | Seal | 404 | Equipment Container |
| 220 | Internal Airflow Barrier | 406 | Lifting Gas Bottles |
| 222 | Airflow Valve | 408 | Cargo Pallets |
| 310 | External Frame | 502 | Motor |
| 312 | Forward Keel | 504 | Driveshaft |
| 314 | Center Keel | 506 | Potential Energy Storage Device |
| 316 | Aft Keel | 508 | Internal Surface |
| 318 | Thrust Brace | 510 | Flexible Member |
| 320 | Bow Cap | | |

DETAILED DESCRIPTION

FIGS. 1 to 6—First Embodiment

The first embodiment of my invention concerns relatively larger airships optimized for long endurance flight above the jet stream.

FIG. 1 is a side view illustrating the general shape and major systems of my airship. The general shape may include a substantially round cross section or be elongated laterally to form a flattened or more airfoil-like shape. An elongated shape uses more of the volume available in aircraft hangers and will also produce some aerodynamic lift.

The vehicle's shape is maintained by a Frame 104, here shown in FIG. 1 with presently preferred six sided cells illustrated disproportionately large for clarity. For relatively large airships such as those intended for assembly and launch from fixed locations, I propose an essentially rigid structure or internal frame of substantially symmetric cells of one or more essentially geometric shapes. This first embodiment is assembled predominately from variations on a "honeycomb" or a substantially six sided hexagonal celled structure with other shapes incorporated in various locations as necessary. Oval or round cells may, for example, better serve to control point stresses where systems pass through this structure or frame. Multiple, repeating cells create an efficient, light weight, and easily manufactured structure that is, in most cases, strong enough to function without internal supports or other load bearing elements in the space formed by this structural element. A "honeycomb" pattern, with cells of other shapes where necessary, may form any optimum external shape.

The hexagons or "honeycomb" structure should be assembled into a pattern similar to that shown in Frame 104. The hexagons, shown here very large for illustration, may be of any relative size and vary in size as necessary. Members may be curved where necessary so as to create a desired radius or other cross sectional shape. Creating other than a circular cross section may increase the number of member shapes or variations on the basic six-sided cell pattern. Subsections of the structure, such as at the ends or where payloads attach, may require specialized cells, sections or fittings. In any case, individual cells are fixed into the contiguous structure by means appropriate to their composition and use, such as adhesives and fasteners. This innovation creates a frame that is lighter for its strength than either traditional rib and guy wires or non-rigid fabrics. This essentially rigid frame or structural element allows significant advantages such as avoiding fabric attachments, puncture tolerance due to the absence of pressurized lifting-gas cells, no drag-inducing propulsion or control protuberances, and spreading loads evenly.

Frame 104, in any combination of variously shaped cells, is formed by fabricating cells in a suitable high strength-to-weight material such as carbon epoxy. Cells may be formed individually or in larger sections. Cells are then joined into a Frame 104 through any suitable fastening means such as adhesives, interlocking joints and/or fasteners, and on any suitable support such as a form in the airship's shape or external suspension means. Frame 104 is here combined with a Keel 106 which may be created from separate structural elements, such as carbon epoxy tubes, from stronger cells designed for the purpose, or from a combination of means. That assembly is overlaid by Covering 102. Covering 102 may be substantially smooth in the conventional manner or, as illustrated in FIGS. 1, 5 and 6, formed from overlapping layers. A combination of suitable materials may be used for Covering 102 such as radiation resistant flexible material and flexible thin film solar cells. Covering 102 does not bear substantial mechanical loads and so does not require the heavy, load-bearing fabrics of the prior art. Features such as Intakes 120 may penetrate Covering 102 with no change in the underlying Frame 104 or through custom formed cells incorporated into Frame 104. The airship carries state of the art solar cells, power storage means, and payload elements but these are not shown for clarity.

This embodiment's gas management systems include Main Gas Cells 110 which are preferably unpressurized. Such lifting-gas cells are further illustrated in FIG. 2 as Outer Main Lifting-Gas Cells 110a and Inner Main Lifting-Gas Cells 110b. This arrangement is illustrative only and not limiting. It is certainly possible, for example, to include a single row of Inner Main Lifting-Gas Cells 110b rather than the two rows seen here. FIG. 2 shows Main Gas Cells 110 anchored to Frame 104 with Lifting-Gas Cell Attachments 111. This presently preferred embodiment includes Attachments 111a anchoring Outer Main Lifting-Gas Cells 110a directly to Frame 104 with other Attachments 111b anchored to Keels 106, which are incorporated into Frame 104.

Main Gas Cells 110 are illustrated in a staggered or layered configuration to take advantage of another quality of essentially rigid frames, that of load distribution. Gas cells attached to the Frame 104 can be overlapped as seen in FIG. 1 so as to evenly distribute lifting loads and dampen dynamic loads such as turbulence. That method is not practical for non-rigid airships which explains the need for up to 1000 psi fabric at the points where normal loads concentrate between their lifting-gas cells. FIGS. 1 and 2 combine to show Main Gas Cells 110 overlapped fore and aft so as to distribute their lifting loads appropriately over Frame 104, and also show multiple cells attached to the same Keel 106 further distributing loads.

FIG. 1 includes Upper Gas Cells 112 substantially lining the upper portion of Frame 104. Those optional Upper Gas Cells 112 may be attached in any conventional manner and somewhat reduce the need for other support to the upper portion of Frame 104 when filled with lifting gas. They also serve to insulate the top of the airship and may be used to support a partially assembled frame during construction.

It is certainly possible to include pressurized or rigid lifting-gas cells but these unpressurized Main Gas Cells 110 are advantageous in eliminating ballonets, requiring far lighter cell material and gaining maximum lift from the gas. They require a conventional lifting gas movement and storage means, not shown, which is far lighter and simpler than the equivalent in pressurized cells. A heat management system that circulates lifting gas to cool the upper surface is a practical function for that gas management system but is also not shown for clarity.

Current airship art requires a number of high drag protuberances such as control surfaces or fins, external propulsion units (often supported by guy wires), and gondolas. My optimized airship dispenses with all such protuberances that are not necessary for the payload (such as cameras), for propulsion (such as Cycloidal Propulsers 125), or for drag reduction (such as an Aerospike 130). Specifically, external flight controls such as fins and exposed support wires, should be avoided.

In this first embodiment, propulsion also serves to control the vehicle's flight through vectored thrust, thereby eliminating the need for external control surfaces with their weight and drag. One or more Intakes 120 at the bow on FIG. 1 cooperate with one or more Impellers 124 to propel air along Ducts 122 to vectoring Nozzles 126 thereby producing vectored Thrust 128. At the rear of the airship on FIGS. 1 and 3, one or more Intakes 120, preferably symmetrically arranged on the airship, are sized and placed as necessary to allow Ducts 122 to transmit air drawn by Impellers 124 into the airship. That air is propelled through at least one vectoring Nozzle 126 producing vectored Thrust 128. It is also possible, and may be preferable, to mount Cycloidal Propulsers 125 from FIG. 9 in place of Impellers 124 or externally as appropriate for the specific application. Frame 104 is especially advantageous for mounting cycloidal propulsers along an airship's sides.

The active boundary layer control illustrated in FIGS. 4-6 require connections, show on FIG. 3, to air movement means such as Impellers 124. Boundary layer control is critical for optimized aerodynamic qualities, especially at very high altitudes. In my airship, that control is accomplished by drawing the separating or Stagnant Air 212 from Boundary Layer 210 through Covering 102. That Stagnant Air 212 is moved by means of low pressure within the propulsion system created by Impeller 124. FIG. 3 illustrates the construction of the control means in this first embodiment. Frame 104 supports Covering 102 which is perforated aft of the airship's widest point with a multitude of small, regularly spaced Openings 103 on FIG. 4. A void or plenum is formed from Covering 102 and Internal Airflow Barrier 220 on FIG. 3. Lifting gas cell material may also form part of that void through joining with Internal Airflow Barrier 220 so as to create a small gap under Frame 104 through which Internal Airflow 214 may pass. The relative vacuum in that void is modulated by Valve 222 on FIG. 3 which variably controls the air allowed through Inlet 120 near where it is mounted in Duct 122.

Aerodynamic qualities are further optimized with Aerospike 130 on FIG. 1, an optional substantially elongated cone-shaped fitting attached to Frame 104 at the bow in order to guide airflow either across a solid bow or, in my first embodiment, through Intake 120. Aerospike 130 is constructed of light weight material such as radiation resistant polymers and installed if beneficial for further decreasing drag from the bow wave.

That bow wave or form drag is also somewhat reduced by Intake 120 at the bow. That intake is formed as an opening in Covering 102 on FIG. 1 communicating with a void or plenum formed from the intersection of Ducts 122 immediately behind the bow and containing Impeller 124. Multiple Impellers 124 may also be mounted elsewhere in the ductwork. Frame 104 should continue across Intake 120 for strength—the frame's cells being exposed where they underlie Intake 120.

Operation—FIGS. 1 to 6—First Embodiment

I propose an optimized airship as described above incorporating several innovative features plus the state of the art in critical subsystems. This optimization improves efficiency at any altitude and is required for long endurance flight above the jet stream.

My innovations include a principle of designing elements to serve more than one major purpose. Therefore, the categories listed below are simply intended to aid understanding and in no way imply limitations.

First Embodiment Operations—Operating Concept

Each attempt at station keeping, or remaining over a small area on the surface while operating an airship above the jet stream, has failed. Prior art has advocated supplying enough propulsive power to overcome prevailing winds with up to three sigma velocity excursions. When combined with poor aerodynamics, that art has consistently failed. The innovations described here solve the technical challenges and allow designing to operate in three sigma wind excursions using velocity alone. But, this first embodiment is lighter, cheaper and more efficient when designed with this operating concept in mind.

Efficient operations require determining the station's boundaries through an analysis of the mission and payload. The vehicle's purpose and capabilities combine to determine if its operating area is on the order of 3 miles or 30 miles or 300 miles in diameter, for example. In the case of a photography mission by way of illustration, the operating area is defined by the angle from the vertical over which the payload camera may traverse before encountering a limit such as a mechanical stop or unacceptable viewing angle. Such optical limits result in operating areas on the order of 25 statute miles in diameter from 60,000 feet.

This operating concept then calls for a vehicle to be flown near the upwind edge of the operating area while it has excess energy available, such as from sunlight, and forced to drift downwind as necessary when operating on stored power. Wind events, both average and high velocities such as storms, must be monitored so as to anticipate above average wind velocities requiring the preemptive action of moving to or even beyond the upwind boundary with excess power. That anticipatory excursion may take the vehicle off station temporarily but is sometimes necessary to maximize time spent on station while resisting a high wind velocity event. The goal in all cases is to maximize the percentage of time spent within said boundaries while operating on stored power until excess energy becomes available. With excess energy, the airship returns to the upwind side of the operating area and renews the power storage means. The details of this method or operating concept derive from a comparison of environmental conditions to vehicle velocity, power consumption, power generation, and power storage capabilities. Such details logically vary between airships and between different missions flown by identical airships.

This operating concept is fundamental to design in that the maximum velocity required with and without excess power sizes the propulsion means such as Impeller 124 and those systems which generate, store and deliver power to it. The weight of such systems with payload sizes the hull and, therefore, features such as Frame 104. Velocity range, size and altitude determine Reynolds Numbers which, in turn, indicates the optimum external shape.

First Embodiment Operations—Aerodynamic Elements

Lutz and Wagner set the standard for calculating optimum airship shape, a standard which forms the foundation for my aerodynamic innovations. Such optimized shape is generalized in FIG. 1's overall profile and serves to reduce form drag as much as is practical by placing the widest part of the airship at the proper point for the Re and creating a Stratford Ramp aft of that widest point. At low Reynolds Numbers, a Stratford Ramp is typically a slightly concave aft surface over which the boundary layer flows. But, given that a particular Stratford Ramp configuration is only effective at essentially one Re, it is not by itself practical for the range of speeds or altitudes in which a flight vehicle must operate. Without my design innovations, the boundary layer on even an optimized shape with Stratford Ramp will still separate just aft of the vehicle's widest point under most operating conditions, thereby creating significant drag.

To that ramp I add active boundary layer control or drag reduction by drawing the boundary layer into the airship as described above. My boundary layer control work excludes a full circumference set of modulated aerodynamic surfaces which is the proprietary work of other inventors. Creating lower pressure within the aft end of the ship relative to the ambient pressure of the boundary layer at that point keeps the boundary layer attached by drawing low energy air through the covering. This means weighs less than the full circumference inlet-type openings described in several sources listed above and works over a wider range of conditions. It is especially advantageous for rigid airships in that their outer coverings do not contain or confine the lifting gas and so may be perforated. This boundary layer control feature is operated by modulating Valve 222 in a manner that maintains an acceptable partial vacuum below Openings 103 in Covering 102 for current conditions. This operation is essentially the same whether Covering 102 is continuous or layered. Drawing some portion of the boundary layer through the Covering 102 reduces drag over a wider range of conditions than is possible with a Stratford Ramp or other shape alone. This drag reduction means may be used at all altitudes and without the Stratford Ramp configuration. It is also effective with either laminar or turbulent flow boundary layers.

In non-rigid or semi-rigid airships, it may be necessary to cover the aft end of the hull with an outer, perforated covering, not simply a duct over a propeller, in order to create the lower pressure condition between that outer covering and an inner, gas containing layer.

First Embodiment Operations—Propulsion Elements

The first embodiment includes longitudinal internal channels or Ducts 122 that enable propulsion units to draw air from one or more openings in Covering 102, such as Intakes 120, move it through some part of the airship, and then expel it with force through a vectoring Nozzle 126. This operation both propels and controls the airship. Innovative advantages include:

Reduces air pressure at the bow. Such pressure reduction necessarily reduces the pressure or "bow" wave that constitutes a significant component of form drag. Therefore, drawing thrust air from the bow also reduces overall drag. While Drucker '982 and others discuss bow openings, that design would actually increase drag given the inefficient shape and high pressure at the bow created by the generating turbine mounted aft of the bow.

Those internal channels allow that accelerated air to be vectored in a manner that maneuvers the airship.

Such propulsion elements are operated conventionally through a guidance and control means essentially identical to that flown on Unmanned Aerial Vehicles whereby Thrust 128 is vectored as necessary to attain the required performance.

First Embodiment Operations—Structural Elements

If optional Upper Gas Cells 112 are affixed immediately below the upper frame as a layer above Main Gas Cells 110, they could aid in vehicle assembly by somewhat supporting a partially completed frame if inflated with lifting gas before lower frame elements are added. This feature simplifies assembly and speeds assembly in somewhat austere locations. Upper Gas Cells 112 also insulate the ship from solar heat concentrated on the ship's upper surface. They may be connected to other lifting-gas cells as a means to circulate that heat by a means not show.

This first embodiment is a relatively larger, more capable airship intended for recovery and reuse. There is also great need for relatively smaller airships capable of rapid employment and cheap enough for partial or total disposal.

DETAILED DESCRIPTION

FIGS. 9 to 11—Additional Embodiment

Relatively small flight vehicles designed for transport before assembly benefit from the structural integrity supplied by External Frame 310 in FIG. 9. That integrity is supplied on the outside of a somewhat pressurized gas containment means or hull rather than inside the outer covering as in a rigid frame. The external frame enables the integration of one or more optional Keels 312, 314 and 316 for rigidity and to anchor the flexible members which constitute the frame. Without an external frame, keels, propulsion elements, payloads, etc., would be glued directly to the hull's thin film with all the problems currently experienced by non-rigid airships magnified by the thin structure dictated by limited weight lifting capacity, especially at very high altitudes.

Generally, this embodiment consists of a non-rigid hull strengthened with structural elements or an External Frame 310 placed outside that gas containment means. Such a frame is composed of elongated material, flexible members or filaments, commonly applied or arranged in layers, which bear loads so that the gas containment means does not bear some or all such loads. This arrangement reduces or obviates the need for the gas containment fabric or film to also serve as a structural element. It also allows systems such as a keel, propulsion, payload, power, etc. to be attached to the external frame rather than to the hull or gas cell's fabric or film.

In this additional embodiment, a conventional gas containing hull is inflated for an integrity check while supported at each end as in a spindle. The hull is then slowly rotated about the supported longitudinal axis while an External Frame 310 is layered or wound over it in a manner similar to building up filament layers in fiberglass container construction. Such filament winding avoids the problem of point stresses introduced to load bearing fibers at points where they cross over and under other fibers in conventional weaving. Such filament winding also allows an external frame to be added and pretensioned over essentially any hull shape such as the non-elliptical shapes optimized for very high altitude. Elongated flexible members or filaments are preferably fixed to each other with adhesives and, as necessary, also adhered to the underlying layer, commonly the hull but likely also systems such as solar cells, antennas and/or keels. The spacing between flexible filaments, and their orientation, is ideally determined by performance and weight requirements—commonly varying from a few millimeters to multiple centimeters. Two flexible filament layers naturally form parallelogram cells where filaments intersect and are fixed into the contiguous structure. Adhesive applied to filaments during the construction process also tends to settle in the slight depression formed by the filaments thereby smoothing the hull's surface and reducing boundary layer turbulence. The resulting slightly textured surface may, depending on flight conditions, still create a non-laminar boundary layer that is more energetic and often advantageous over laminar boundary layers. But, if a smooth external covering is desired for any reason, the external frame may itself be covered by a smooth layer. Such a smooth layer may be partially or wholly composed of flexible solar cells, which may also be affixed on top of the entire assembly in any case.

A partial or full length substantially rigid keel is often advantageous. Such structure has also sometimes proved necessary in conventional rib and wires frames. On a non-rigid hull, a keel has sometimes been attached to the hull's material to form a semi-rigid airship with techniques similar to current fabric patches and adhesive attachments. This conventional method suffers from the same fabric stresses and aerodynamic penalties that severely limit non-rigid designs. It is more advantageous, and heretofore unanticipated, to attach a keel to my external frame applied outside a non-rigid gas containment means or hull thereby reducing mechanical stress on the hull while strengthening the airship. A round cross section carbon epoxy Keel 314, for example, should be attached by incorporation with the hull and overlaid during the filament winding process described above and then finished as in FIG. 11. That figure shows External Frame 310 applied over Gas Cell 110 with Payload Tunnel 322 inserted into the hull. Keel 314 is here divided into two sections which support Payload Tunnel 322, support Generic Payload 328 at Payload Supports 326, and show Frame 310 trimmed and attached to the keel in a manner that forms an opening for the payload. Alternatively, an External Frame 310 may also be added during hull manufacturing with other elements affixed afterwards.

A keel may serve purposes other than structural integrity such as gas storage, integrated antenna, payload return system (see aircraft as keel in Ramifications), etc. This configuration also enables payload movement for fore and aft pitch control by allowing payload elements to move along keel elements. Such multiple uses are consistent with the fundamental design theme of this airship innovation to reduce weight by using systems for multiple purposes.

This additional embodiment executes that smaller, faster, cheaper design philosophy in accordance with my innovations and reduces the above description to practice. The overall shape seen in side view FIG. 9, in either essentially round or laterally flattened forms, is consistent with an aerodynamic external shape optimized for very high altitude Reynolds Numbers and is permitted by the operating concept described above. Materials are essentially the same as in the first embodiment, such as carbon epoxy.

To that general layout, the propulsion system is shown as two Cycloidal Propulsers 125 in FIG. 9 attached at the aft end with their axes oriented essentially perpendicular to each other. This airship is too small and transportable for internal propulsion so the external elements are fixed to Engine Mount 330 with conventional fastening means. That assembly is supported by Aft Keel 316.

Cycloidal propulsers have been proposed for low altitude airships since the early $20^{th}$ century with much of the theoretical work accomplished in the 1930s and 1970s. The American Institute of Aeronautics and Astronautics (AIAA) maintains a number of papers that extend such theory into stratospheric airships. While such propulsion has never flown on a full scale airship, the combination of efficiency, light weight, constant chord and twist (no propeller tip speed problems) and ability to vector thrust anywhere in the plane of rotation are advantages that must be seriously considered. Two cycloidal propulsers mounted at approximately 90 degrees to each other, illustrated as Cycloidal Propulsers 125 on FIG. 9, would provide both thrust and flight controls at all airspeeds for relatively smaller airships while also controlling the boundary layer aft of the airship's widest point. They may also be physically separated with, for example, one propulser mounted on the bottom near the vehicle's widest point. Airships requiring more thrust would incorporate additional cycloidal propulsers arranged along the length of the vehicle, an option facilitated by Frame 104. Such propulsion means would control the ship at all velocities by vectoring thrust in the plane of rotation as necessary. Propulsers may also be mounted internally in place of Impellers 124 with the resultant thrust vectored by Nozzles 126.

Active boundary layer control is achieved by mounting the propulsion means at the aft end of the airship in a manner that draws the boundary layer through the propulsion means without allowing separation.

Given that velocity may deform the bow in non-rigid construction, thrust may be communicated with optional Thrust Brace 318 to Bow Cap 320 thereby preventing deformation of the hull. Forward Keel 312 tends to serve the same purpose if installed. The state of the art power generation, storage and delivery means are not shown.

Recovery is accomplished primarily with a unique and innovative operating concept that uses the expendable hull as an air bag. FIG. 9 includes Parachute 324 as an optional high drag device for use in that recovery method. It is mounted so as to aid in balancing the airship with risers attached so as to orient the airship after deployment.

This embodiment is designed to be easily transportable for rapid assembly and launch. FIG. 10 shows additional elements enabling that transport. Most of the shipping container is not shown for clarity but Dividers 402 and Equipment Container 404 illustrate the ability to package the entire airship on four Cargo Pallets 408. The shipping container may also be floor loaded directly into the transport means. Optional Lifting Gas Bottles 406 may be included in or under the shipping container but that gas is best acquired locally. Payload Tunnel 322 with affixed Center Keel 314 forms the solid base on which forward and aft sections of the hull with affixed External Frame 310 are folded. Other elements, such as disassembled Cycloidal Propulsers 125*a* and 125*b*, are shown included in the complete package. Keels 312 and 316 are shown separately and disconnected for packing. Alternatively, they could be shown folded along with External Frame 310, either means being acceptable if rapid assembly and in-flight performance qualities are retained.

The external frame design method may, of course, also be used for airships that are not transported before assembly and launch. It is especially appropriate for relatively small airships in which the weight of a rigid frame or heavy fabric would take up an unacceptable proportion of the allowable gross weight. For vehicles with such structural elements or frames: the smaller the vehicle, the generally larger the proportion of structural weight to gross weight. That relationship also holds true for non-rigid airships constructed with multiple layers of very strong, ultraviolet resistant fabric because such load bearing fabric is necessarily heavy.

Operation—FIGS. 9 and 11—Additional Embodiment

Transport: The smallest practical transport aircraft may carry a single object of essentially the same length as four standard 88 inch long cargo pallets. The hull of a semi-rigid airship may be designed so as to fold into a container of essentially that length and no more than approximately 100 inches wide. A 70 foot (840 inches) long semi-rigid hull could be folded at a joint or joints in the keel approximately 300 inches from one or both end, for example. In this additional embodiment, the transportable airship is tested before one or more keel segments, and bulky elements such as propulsion systems, payloads and power storage that are not incorporated into a keel segment, are removed or unlocked at joints as necessary. The complete airship is then packed in sections into a shipping container suitable for transport on a C-130 class aircraft.

Field Assembly and Launch: A transported airship may have to be assembled and launched in austere conditions. In this embodiment, the airship should be unfolded in an aircraft hanger or inside an area bounded by four or more vehicles or other heavy objects placed near the front and rear of the airship. Those vehicles serve as anchors for the airship during assembly and inflation, either inside a hanger or within a windscreen. The vehicles may also support a flexible windscreen bounding the area so as to shield the airship from wind. The properly designed airship is unfolded, assembled, inflated and checked preferably within this temporary space or enclosure. When appropriate, the airship is released to rise vertically. The airship may alternatively be assembled within a more permanent structure and then driven outdoors for launch while attached to the vehicles. These design and assembly methods produce capabilities that are much more robust in-flight and much less restricted by transport and wind limitations than is the current art. Launch is conventional while in-flight operation follows the concept described in the first embodiment.

Recovery: Reducing the required ground support is an important design criterion. Such ground support is most difficult on landing when many personnel and much equipment is typically required to gain and maintain control of a lighter-than-air vehicle exposed to environmental forces while operating with little or no flight control effectiveness at low speed. This embodiment obviates much of that risk and support requirement by designing the vehicle to use its hull as a cushioning device for a soft impact landing. Recovery begins with a rapid descent to the desired landing point. The hull should be kept inflated for aerodynamic control during descent from altitude with gas introduced from storage, such as pressurized containers, or solid fuel gas generators, not shown. Systems to be preserved or cushioned on landing, such as the payload, propulsion, and power means, should be moved away from impact points by aerodynamically rolling and/or orienting the airship with its flight control means, or deploying a Parachute 324 which is attached so as to properly orient the airship essentially upside down. Final descent rate may be slowed with the propulsion system and/or the parachute to supplement the naturally high drag of an airship flying below its design altitude. The hull should be opened or vented shortly before landing so that it will not bounce and so that it deflates rapidly after landing. Attaching Parachute 324's risers to appropriate cutting means will vent the hull on parachute deployment. Relative to the slow, horizontal landings in current art, this landing method allows for very rapid and controlled descent while greatly reducing the number of required skilled ground personnel and the risk to them.

RAMIFICATIONS

While the above description contains many specifics, these should not be construed as limitations on the scope of the invention but as examples of the present embodiments. Many other ramifications and variations are possible within the teachings of my invention. For example, a number of optional ramifications, variations or additions may enhance a tailored airship's ability to carry out its mission and should be considered for incorporation on a case by case basis so as to optimize the vehicle:

Overlapped Covering: The openings in Covering 102 which admit Stagnant Air 212 may alternatively be formed from spaces between layers open either forward as in FIG. 5, or aft as in FIG. 6. Seals 216 are optional means to exclude water and other matter and may be fixed between covering layers. This means to draw Boundary Layer 210 though Covering 102 may omit Seals 216 but aft facing openings are advised in that configuration. Overlapping in this manner may, for example, be advantageous where Covering 102 is formed from sheets of flexible solar cells or where manufacturing considerations favor that configuration.

Mechanical Energy Storage: Energy storage is the single most difficult problem facing long endurance vehicles and drives airship designs beyond weights that can be effectively flown at very high altitudes. This problem is especially acute if storage means are sized to power propulsion systems that can fully resist significant wind velocities, a problem somewhat solved by my operating concept. Electrical power is traditionally stored in battery packs or chemical storage such as fuel cells. Mechanical energy storage systems have traditionally stored potential energy by means of clock springs, leaf springs, raised pendulum weights and the like. In this application, such mechanical storage means find a new use where it is advantageous in lighter total weight for the energy stored. Mechanical systems may also be simpler, not suffer the energy losses necessary in conversion from one form of energy to another, and use necessary systems such as transmissions for multiple purposes. One mechanical energy storage ramification is the Potential Energy Storage Device 506 illustrated in FIGS. 7 and 8. Excess torque or power not needed by the propulsion system is diverted by a mechanical energy transmission means, such as a selectable gear not shown, into the Flexible Member 510 thereby storing mechanical power without conversion. Motor 502 rotates Driveshaft 504 which selectably turns Internal Surface 508. Flexible Member 510 thereby winds about Internal Surface 508 in a manner reminiscent of a watch mainspring. When desired, the system transmits power through the transmission means to Driveshaft 504 by reversing the process, again without energy conversion. This hybrid power arrangement has the additional advantage of an option to mount the flexible energy storage member on an existing propulsion system driveshaft or other suitable rotating member such as an output from Motor 502. Other mechanical storage arrangements are similarly possible such as a member torqued about its axis or stretched like a rubber band rather than wrapped over an axel, a member torsioned longitudinally like a longbow, or a weight such as the payload or energy storage means lifted like a clock weight so as to store power as the potential energy of vertical distance.

Reinforced Rigid Frame: In addition to the essentially rigid frame disclosed above, it is possible to strengthen Frame 104 by wrapping it in a flexible frame or mesh, not shown. Tightening that flexible mesh over the rigid frame serves to pretension the rigid frame while also distributing stresses. Techniques used to create External Frame 310 may be used in this ramification. Weight added by the reinforcing fibers is more than offset by weight removed from the rigid frame. The whole is also more damage tolerant given the multiplicity of points at which the fibers anchor to the rigid frame or other fibers through conventional means such as adhesives. Given that the mesh's cells are substantially smaller than the rigid frame's cells or openings, the flexible mesh also serves to create a more evenly supportive base for the airship's covering.

Stress Free Covering for Rigid Frame: When covering a rigid frame, an external covering need not be continuous or affixed at all seams. Flexible solar cells and other material may be, for example, layered in such a manner as to overlap, but not rigidly fix, the layers to each other at all seams. This arrangement substantially eliminates stress in the covering material and allows air, such as Stagnant Air 212, to be drawn through the covering if desired.

Aircraft as Keel: Airship hulls and subsystems may be expendable. Important or costly systems may be recovered by conventional means such as parachutes but such single use recovery means burden the airship with weight that serves only one function. Multiple use systems are often more weight efficient. A keel may be formed from the fuselage and reconfigurable wings of a powered or unpowered aircraft thereby serving as a structural element during airship operation and also as a long-range, highly maneuverable systems return platform at the end of the mission. The airship's propulsion means may also serve as the aircraft's propulsion means.

Adjustable, Rigid Solar Cells: Flexible solar cells attached to the hull may not be desired and rigid cells are always more efficient. Rigid cells may be used but only with accommodations for orienting them toward the sun as it tracks across the sky. There is no need to keep the sunlight precisely normal to the solar cells as they operate over a range of angles of incidence. I believe rigid solar cells are best suspended below the hull on one or more somewhat inflexible elements extended from the hull's structure. One-sided panels should be used to reduce weight with a means to flip the panels in such a way as to present the solar cells to either side of the airship as required. The panels should be aligned along the airship's axis so as to be streamlined with the relative wind. Alternatively, rigid cells mounted below the airship may also serve as a rudder for flight control.

Retractable Solar Cells: Flexible solar cells may be unrolled below an airship in a manner similar to roller blinds. Means must be incorporated to protect such flexible material from wind loads. The cells may be retracted and extended as desired.

Advantageously Placed Flexible Solar Cells: To date, flexible solar cells have invariably been placed symmetrically across the top of the hull. Given that the prevailing wind for any location and season is well known, this ramification calls for attaching flexible solar cells asymmetrically on the side which will be presented to the sun when the ship is pointed into the prevailing wind. This arrangement is lighter in that it omits those cells which would otherwise operate inefficiently or not at all. It also allows the cells to be installed in a manner that optimizes their power potential while presenting cells connected in series with even sunlight, thereby reducing the problem of the least productive cell limiting voltage in all connected cells.

Multiple Screw Propellers: Screw-type conventional propellers may be mounted at the rear of the ship in a counter-rotating, common axis configuration so as to eliminate the need for fins to counteract torque. The smaller propeller should be mounted at the extreme aft end of the ship and may be gimbaled to vector thrust. The larger propeller should be mounted some distance forward from the smaller one and consist of blades mounted on a rotating ring which is itself integrated into Engine Mount 330. It is also possible to vector the thrust by operating the two propellers at different speeds, so that they do not entirely cancel each other's torque, or to modulate one or both of them with a cyclic arrangement such as is found on helicopters. Screw propellers are primarily advantageous in pulling the airship's boundary layer through the propulsion system at approximately the point where that boundary layer would otherwise separate and increase drag.

Hybrid Cycloidal and Screw Propeller Drive: Combining cycloidal and screw propellers retains the full circumference drag reduction potential for screw propellers mentioned above while adding a portion of the cycloidal's thrust vectoring qualities. In this ramification which is illustrated in FIG. 12, the Screw Propeller Blades 340 are mounted to a Propeller Mounting Ring 342. A Cycloidal Propulser 125 is mounted at the extreme aft end of the airship with Cycloidal Propulser Blades 344 rotating in the relatively undisturbed air at the center of the flow created by Screw Propeller Blades 340. Propulser Attachments 348 fix the propulsion means to the Engine Mount 330 at the Propulser Mounting Ring 346. The mounting ring is rotatable about the airship's horizontal axis up to 90 degrees in order to vector thrust for both pitch and yaw control. This configuration allows full flight control with one cycloidal propulser.

Airfoils: It is sometimes advantageous to supplement buoyant lift with aerodynamic lift. That need may be met with a hull shape that also generates lift or fixed wings such as on hybrid designs. I propose internally stored airfoils that extend through the external covering when desired to temporarily generate lift. Such airfoils could also be part of the external covering that may extend on somewhat flexible supports or members. Easily deployable airfoils can generate aerodynamic lift from forward velocity or reduce decent rate as either lift or drag devices. They are especially advantageous for reducing an airship's descent rate when reducing altitude thereby allowing for much faster descents than is possible with buoyant lift alone. Such airfoils allow a rapidly descending airship to "round out" to more horizontal flight as do aircraft.

CONCLUSION AND SCOPE

Accordingly the reader will see that, according to various aspects of the invention, I have provided details on optimizing lighter-than-air vehicles, especially for operation above the jet stream, through reducing aerodynamic drag as much as is practical. I have also provided a method for operation that facilitates that optimization, and for transportability enroute to field assembly, launch and recovery.

The scope of the various embodiments of the invention should be determined by the appended claims and their legal equivalents, and not by the examples detailed above.

The invention claimed is:

1. A lighter than air vehicle comprising:
   a substantially flexible load bearing structure;
   a lifting gas containment means;
   said flexible load bearing structure composed of at least one layer of filaments externally supporting said lifting gas containment means;
   wherein said flexible load bearing structure forms a load bearing frame mounted external to said lifting gas containment means that provides and maintains a deployed shape of said vehicle;
   said lighter than air vehicle capable of being folded into a second shape and unfolded to reform said deployed shape.

2. The lighter than air vehicle of claim 1, wherein said at least one layer of filaments is mounted while said vehicle is being rotated during assembly.

3. The lighter than air vehicle of claim 1, wherein said at least one layer of filaments is adhered to said lifting gas containment means.

4. The lighter than air vehicle of claim 1, wherein solar power collection means are attached externally from said load bearing frame.

5. The lighter than air vehicle of claim 1, wherein solar power collection means are attached between said load bearing frame and said gas containment means.

6. The lighter than air vehicle of claim 1, wherein said at least one layer of filaments is attached to at least one substantially rigid structural member.

7. A process for assembling and using a lighter than air vehicle comprising:
   providing at least one layer of flexible filaments such that the at least one layer of flexible filaments is mounted external to the lifting gas containment means to form an external load bearing frame and provide and maintain a deployed shape for the lighter than air vehicle;
   folding said lighter than air vehicle into a second shape;
   unfolding said lighter than air vehicle to reform said deployed shape.

8. The process for assembling and using the lighter than air vehicle of claim 7, wherein said lighter than air vehicle is inflated and launched while temporarily attached to at least one object heavy enough to prevent flight.

9. The process for assembling and using the lighter than air vehicle of claim 7, wherein said lighter than air vehicle is moved while inflated and attached to at least one object heavy enough to prevent flight.

10. A method of landing an airship comprising:
    providing a lifting gas containment means;
    providing means to orient said airship in an inverted attitude;
    inverting said airship;
    impacting a landing surface while said airship is inverted.

11. The method of landing an airship of claim 10, wherein said airship is oriented in an inverted attitude with the assistance of a deployed device that creates aerodynamic drag.

12. The method of landing an airship of claim 10, wherein the vehicle is oriented in an inverted attitude with thrust vectored by the propulsion means.

13. The method of landing an airship of claim 10, wherein displacing some lifting gas from said lifting gas containment means by a second gas.

14. The method of landing an airship of claim 10, wherein the gas containment means is intentionally reputured.

* * * * *